(12) United States Patent
Altheimer

(10) Patent No.: US 12,440,070 B2
(45) Date of Patent: Oct. 14, 2025

(54) TWO-SIDED CUTTING BOARD

(71) Applicant: ANCHOR HOCKING, LLC, Columbus, OH (US)

(72) Inventor: Dana W. Altheimer, West Bend, WI (US)

(73) Assignee: ANCHOR HOCKING, LLC, Columbus, OH (US)

(*) Notice: Subject to any disclaimer, the term of this patent is extended or adjusted under 35 U.S.C. 154(b) by 370 days.

(21) Appl. No.: 18/082,159

(22) Filed: Dec. 15, 2022

(65) Prior Publication Data

US 2023/0180966 A1 Jun. 15, 2023

Related U.S. Application Data

(60) Provisional application No. 63/289,769, filed on Dec. 15, 2021.

(51) Int. Cl.
*A47J 47/00* (2006.01)
(52) U.S. Cl.
CPC .................................... *A47J 47/005* (2013.01)
(58) Field of Classification Search
CPC ...................................................... A47J 47/005
See application file for complete search history.

(56) References Cited

U.S. PATENT DOCUMENTS

| | | | | |
|---|---|---|---|---|
| 5,501,441 A | * | 3/1996 | Kegley | A47J 47/005 269/302.1 |
| 6,910,685 B2 | | 6/2005 | Sellers | |
| 7,178,798 B1 | * | 2/2007 | Funk | A47J 47/005 269/302.1 |
| 10,337,139 B2 | | 7/2019 | Desrosiers | |
| 11,684,219 B2 | * | 6/2023 | Noto | A47G 23/06 269/15 |
| 2009/0014935 A1 | * | 1/2009 | Zeng | A47J 47/005 269/302.1 |
| 2009/0200723 A1 | * | 8/2009 | Lim | A47J 47/005 269/289 R |
| 2011/0031672 A1 | * | 2/2011 | Phillips | A47J 47/005 156/308.2 |
| 2017/0035253 A1 | | 2/2017 | Pimentel et al. | |
| 2021/0251431 A1 | * | 8/2021 | Wirth | A47J 47/005 |
| 2023/0180966 A1 | * | 6/2023 | Altheimer | A47J 47/005 269/289 R |

* cited by examiner

*Primary Examiner* — Lee D Wilson
(74) *Attorney, Agent, or Firm* — TUCKER ELLIS LLP

(57) ABSTRACT

A cutting board apparatus includes a cutting board base formed from a rigid material. The cutting board base includes a first side and a second side opposite the first side. The cutting apparatus further includes a flexible cutting mat having a cutting surface and a gripping surface opposite the cutting surface. The flexible cutting mat is configured to removably nest with the first side of the cutting board base, and the flexible cutting mat comprises a thermoplastic elastomeric material. The cutting board base and the flexible cutting mat can be used in a nested configuration, or as separate and independent cutting surfaces.

13 Claims, 7 Drawing Sheets

TWO-SIDED CUTTING BOARD

CROSS-REFERENCE TO RELATED APPLICATIONS

This application claims priority to and the benefit of U.S. Provisional Application No. 63/289,769 filed on Dec. 15, 2021, the entirety of which is incorporated herein by reference.

TECHNICAL FIELD

In general, the present invention relates to a cutting board.

BACKGROUND OF THE INVENTION

Cutting boards are used in a kitchen setting to provide a surface on which to cut food such as meats, fruits, vegetables, spices, or nuts, among others. Cutting boards are typically made of materials such as wood, bamboo, or plastic. When a cut is made in the surface of a cutting board by a cutting tool such as a knife, the cut can leave a trough in the surface of the cutting board. These troughs can harbor micro-ban, bacteria, or food particles, creating an unsanitary condition for food preparation. Further, these materials often provide a slippery surface that can cause the cutting tool to slip and cause injury to a user.

Accordingly, cutting boards providing an improved cutting surface and greater versatility are desirable.

SUMMARY OF THE INVENTION

In accordance with an embodiment of the present invention, a cutting board apparatus includes a cutting board base formed from a rigid material. The cutting board base includes a first side and a second side opposite the first side. The cutting apparatus further includes a flexible cutting mat having a cutting surface and a gripping surface opposite the cutting surface. The flexible cutting mat is configured to removably nest with the first side of the cutting board base, and the flexible cutting mat comprises a thermoplastic elastomeric material.

In an embodiment, the flexible cutting mat further comprises polypropylene in the range of 1% to 30% of the material makeup of the flexible cutting mat.

In an embodiment, the flexible cutting mat further comprises polypropylene in the range of 1% to 10% of the material makeup of the flexible cutting mat.

In an embodiment, the flexible cutting mat has a durometer in the range of 45 to 65.

In an embodiment, the flexible cutting mat has a durometer in the range of 55 to 65.

In an embodiment, the cutting surface of the flexible cutting mat is a self-healing surface configured to, upon receiving a cut, significantly close sides of the cut back upon themselves to at least partially seal the cut.

In an embodiment, the cutting board base comprises a first channel extending along at least a portion of a perimeter of the first side of the cutting board base.

In an embodiment, the flexible cutting mat is at least partially surrounded by the first channel when the flexible cutting mat removably nests on the first side of the cutting board base.

In an embodiment, the flexible cutting mat includes beveled edges that slope from the cutting surface of the flexible cutting mat towards the first channel while the flexible cutting mat is nested with the first side of the cutting board base.

In an embodiment, the flexible cutting mat further comprises a second channel extending along at least a portion of a perimeter of the cutting surface of the flexible cutting mat, wherein the second channel is configured to removably nest within the first channel while the flexible cutting mat is nested with the first side of the cutting board base.

In an embodiment, the cutting board base comprises an opposing channel extending along at least a portion of a perimeter of the second side of the cutting board base.

In accordance with an embodiment of the present invention, a flexible cutting mat includes a cutting surface that is a self-healing surface configured to, upon receiving a cut, significantly close sides of the cut back upon themselves to at least partially seal the cut. The flexible cutting mat further includes a gripping surface opposite the cutting surface. The flexible cutting mat includes a thermoplastic elastomeric material and polypropylene in the range of 1% to 30% of the material makeup of the flexible cutting mat.

In an embodiment, the polypropylene is included in the range of 1% to 10% of the material makeup of the flexible cutting mat.

In an embodiment, the flexible cutting mat further includes a channel extending along at least a portion of a perimeter of the cutting surface of the flexible cutting mat.

In an embodiment, the flexible cutting mat has a durometer in the range of 45 to 65.

In an embodiment, the flexible cutting mat has a durometer in the range of 55 to 65.

In accordance with an embodiment of the present invention, a cutting board apparatus includes a cutting board base formed from a rigid material. The cutting board base includes a first side having a first channel extending around at least a portion of a perimeter of the cutting board base, and a second side opposite the first side. The cutting board apparatus further includes a flexible cutting mat that includes a cutting surface that is a self-healing surface configured to, upon receiving a cut, significantly close sides of the cut back upon themselves to at least partially seal the cut, and a gripping surface opposite the cutting surface. The flexible cutting mat is configured to removably nest with the first side of the cutting board base, and the flexible cutting mat has a durometer in the range of 55 to 65 and comprises a thermoplastic elastomeric material and polypropylene in the range of 1% to 10% of the material makeup of the flexible cutting mat.

In an embodiment, the flexible cutting mat is at least partially surrounded by the first channel when the flexible cutting mat removably nests on the first side of the cutting board base.

In an embodiment, the flexible cutting mat includes beveled edges that slope from the cutting surface of the flexible cutting mat towards the first channel while the flexible cutting mat is nested with the first side of the cutting board base.

In an embodiment, the flexible cutting mat further includes a second channel extending along at least a portion of a perimeter of the cutting surface of the flexible cutting mat. The second channel is configured to removably nest within the first channel while the flexible cutting mat is nested with the first side of the cutting board base.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to a cutting board apparatus and its various components. An embodiment of the cutting board apparatus can include a cutting board base formed from a rigid material. The cutting board base includes a first side and a second side opposite the first side. The cutting board apparatus can further include a flexible cutting mat having a cutting surface and a gripping surface opposite the cutting surface. The flexible cutting mat is configured to removably nest with the first side of the cutting board base. The flexible cutting mat can be made from a thermoplastic elastomeric material along with polypropylene. In certain embodiments, the cutting surface can have self-healing properties such that upon receiving a cut, the sides of the cut are configured to significantly close back upon themselves to at least partially seal the cut. Each of the flexible cutting mat and the cutting board base can be used independently as a cutting surface, or alternatively nested together for storage and/or use as a cutting surface.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
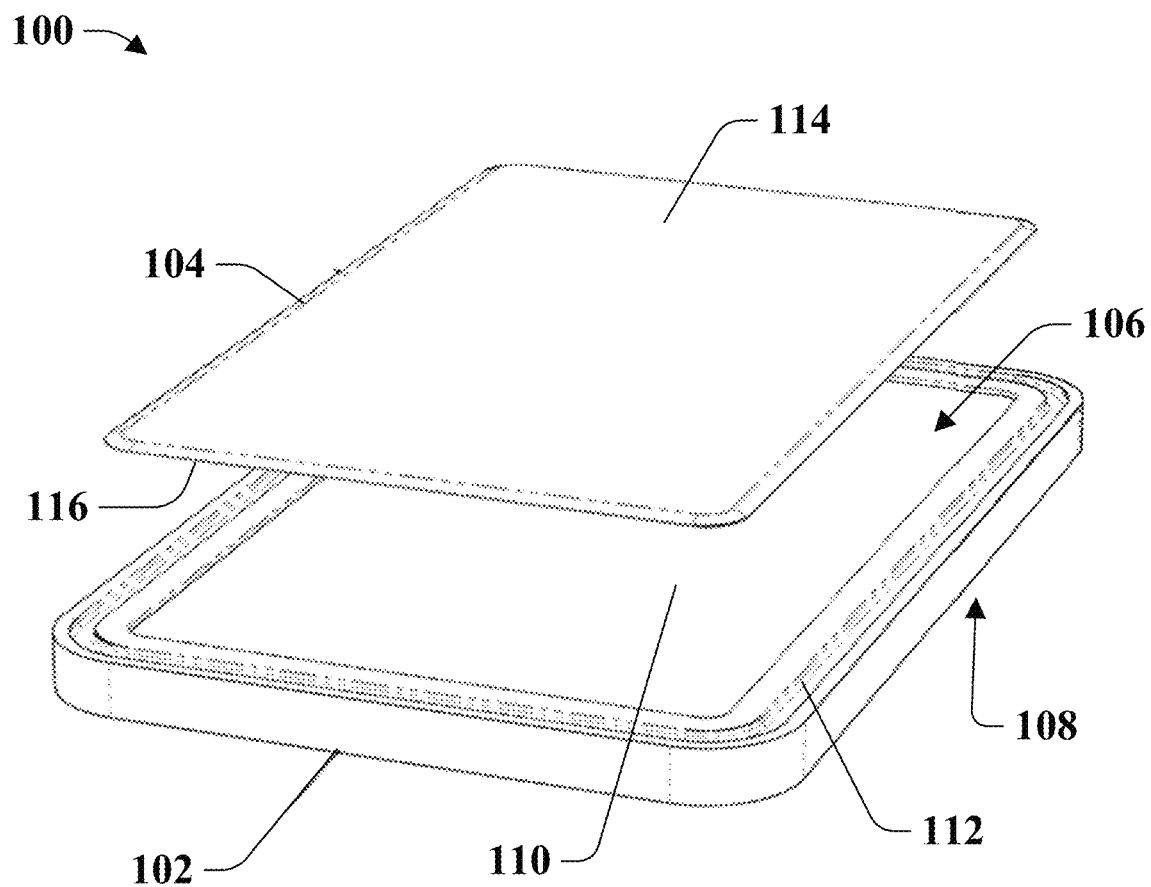
FIG. 1 is a perspective view of an exemplary cutting board apparatus.

Referring now to the drawings, wherein the drawings are for the purpose of illustrating an exemplary embodiment of the invention only and not for the purpose of limiting same, FIG. 1 illustrates an exemplary cutting board apparatus 100. The cutting board apparatus 100 includes a cutting board base 102 and a flexible cutting mat 104. The cutting board base 102 can include a first side 106 and a second side 108 opposite the first side. The first side 106 can include a recess 110 configured to receive the flexible cutting mat 104. The first side 106 can also include a first channel 112 that extends around at least a portion of the perimeter of the cutting board base 102 and surrounding at least a portion of the recess 110.

One or both of the first side 106 and second side 108 can be configured to be used as a cutting surface. In certain embodiments, the cutting board base can be constructed of any form of wood, bamboo, polypropylene, resin, resin composite, wood flour, or any other materials selected using sound engineering judgment.

The flexible cutting mat 104 can include a cutting surface 114 and a gripping surface 116 opposite the cutting surface. The flexible cutting mat 104 can be sized and shaped such that the flexible cutting mat 104 removably nests on the first side 106 of the cutting board base 102. For example, the flexible cutting mat 104 can nest within the recess 100 with the gripping surface 116 in contact with the first side 106 of the cutting board base 102. The flexible cutting mat 104 can be removed from the cutting board base 102 such that both of the flexible cutting mat 104 and the cutting board base 102 can be used independently and/or complementary to one another as cutting surfaces. For example, the cutting board base 102 can be used as a hard cutting surface on either of its first side 106 or second side 108 for one type of cutting (e.g. chopping of nuts or other hard items), and the flexible cutting mat 104 can be used as a softer cutting surface for a second type of cutting (e.g. slicing vegetables or meats). Alternatively, the flexible cutting mat 104 can be used as a cutting surface while nested in the cutting board base 102. The cutting board apparatus 100 can also be stored in this nested configuration. In one embodiment, the flexible cutting mat 104 is dishwasher safe. In another embodiment, both the flexible cutting mat 104 and the cutting board base 102 are dishwasher safe.

The flexible cutting mat 104 can be constructed of a thermoplastic elastomeric (TPE) material and polypropylene. The TPE provides the flexible cutting mat 104 with certain elastomeric qualities that provide certain benefits as described in further detail below. While the TPE provides the flexible cutting mat 104 with flexibility and softness, the addition of polypropylene provides a level of rigidity, structure, and dimensional stability, which would allow the flexible cutting mat 104 to, for example, stand upright in a dishwasher. Further, including polypropylene in place of a certain amount of TPE can reduce the cost of materials in the production of the flexible cutting mat. In certain embodiments, the flexible cutting mat 104 can include polypropylene in a range of 1% to 30% of the total material. In further embodiments, the flexible cutting mat 104 can include polypropylene in a range of 2% to 20% of the total material. In still further embodiments, the flexible cutting mat 104 can include polypropylene in a range of 1% to 10% of the total material. In one embodiment, the TPE is 30 durometer TPE and the polypropylene is 70, 80, or 90 durometer polypropylene. The resulting flexible cutting mat 104 can be between 45 and 65 durometer, or more specifically, between 55 and 65 durometer.

The flexible cutting mat 104 has various properties that provide multiple benefits to a user. The cutting surface 114 can be a self-healing surface configured to, upon receiving a cut from a cutting tool such as a knife, significantly close sides of the cut back upon themselves to at least partially seal the cut. This feature is described in greater detail with respect to FIGS. 9A and 9B. The softness of the flexible cutting mat 104 provides for the cutting surface 114 that minimizes the dulling effect on a cutting tool such as a knife. With hard cutting boards made from resin, wood, or bamboo, the hard surface microscopically bends a sharp knife edge, causing the knife blade to dull. The softness of the cutting surface 114 of the flexible cutting mat 104 (e.g. 45 to 65 durometer) prevents such a dulling effect. Further, when a cutting tool's blade is dragged along the cutting surface 114, the flexible cutting mat 104 provides a braking force that slows down the cutting device. For example, as the blade creates a small cut in the cutting surface 114, both sides of the cut provide friction on either side of the blade and/or to the edge of the blade to slow the blade down and allow for a more controlled cutting motion by the user. This braking force provided by the flexible cutting mat 104 creates a safer cutting process and prevents a blade from slipping and cutting the user, thereby preventing injury. A further benefit is that the gripping surface 116 can adhere to a smooth surface such as a countertop (e.g. granite, wood, soapstone, formica, quartz, cement, among others).

Figure 2:
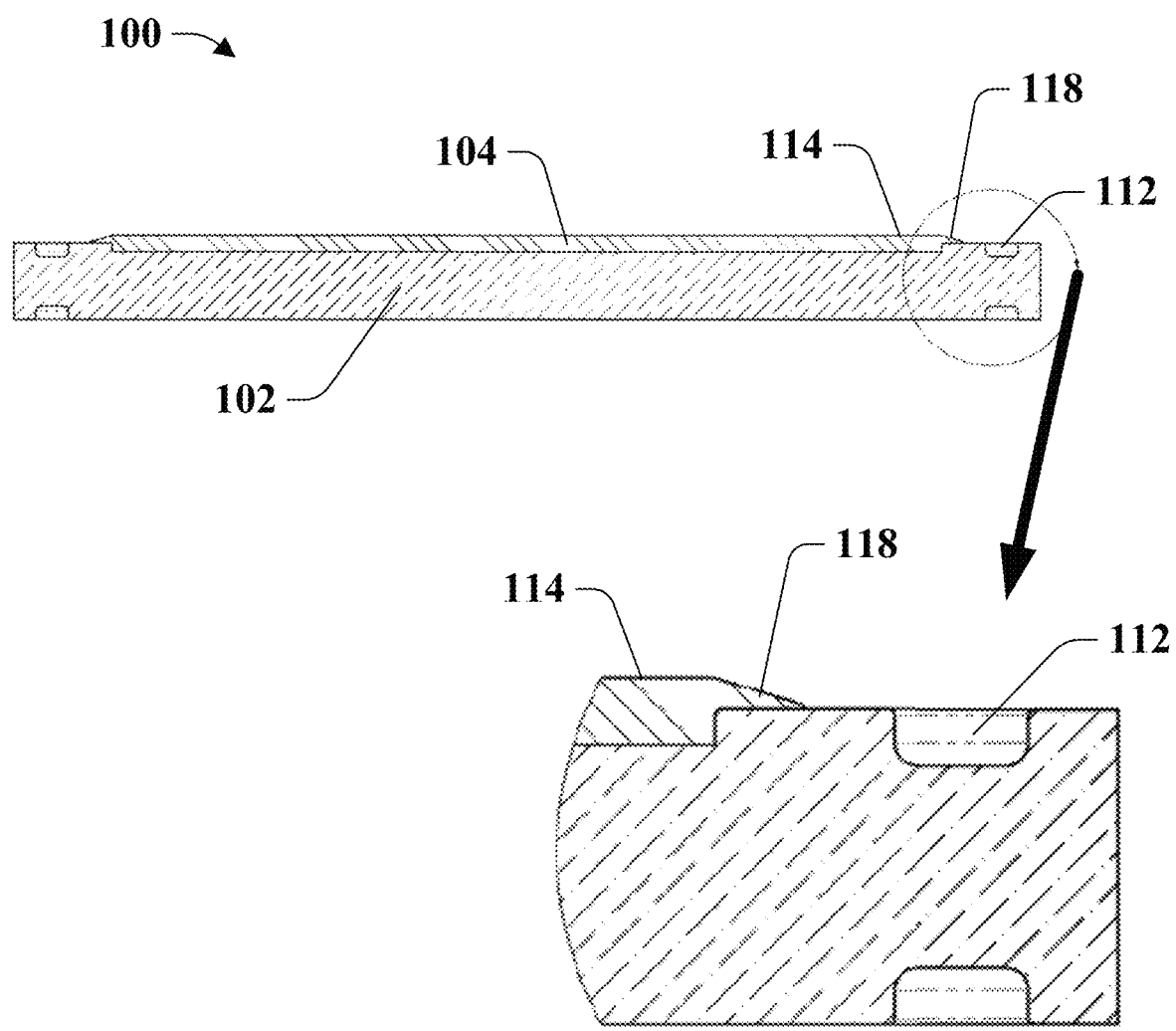
FIG. 2 is a cross-sectional view of an exemplary cutting board apparatus.

Turning now to FIG. 2, a cross-sectional view of the cutting board apparatus 100 is shown. FIG. 2 depicts the flexible cutting mat 104 in a nested configuration with the cutting board base 102 such that the flexible cutting mat 104 is nested within the recess 110. In certain embodiments, the flexible cutting mat 104 can have a beveled edge 118. The beveled edge 118 can slope from the cutting surface 114 to the first channel 112. In operation, a user can cut, for example, a fruit or a meat on the flexible cutting mat 104 while it is nested with the cutting board base 102. Any juices that run off from the food can run down the beveled edge 118 and into the first channel 112, where the juices can be collected for later disposal or removal.

Figure 3:
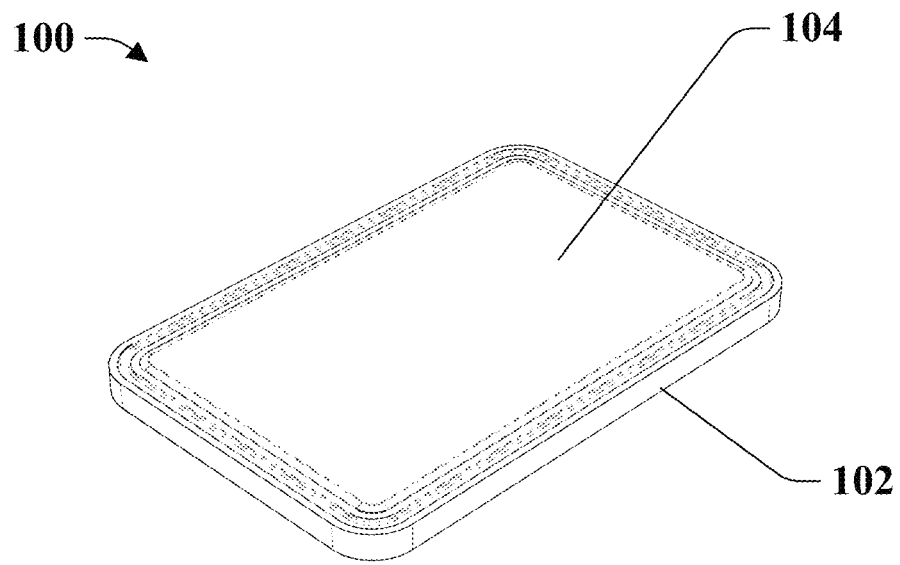
FIG. 3 is a perspective view of an exemplary cutting board apparatus in a nested configuration.
Figure 4:
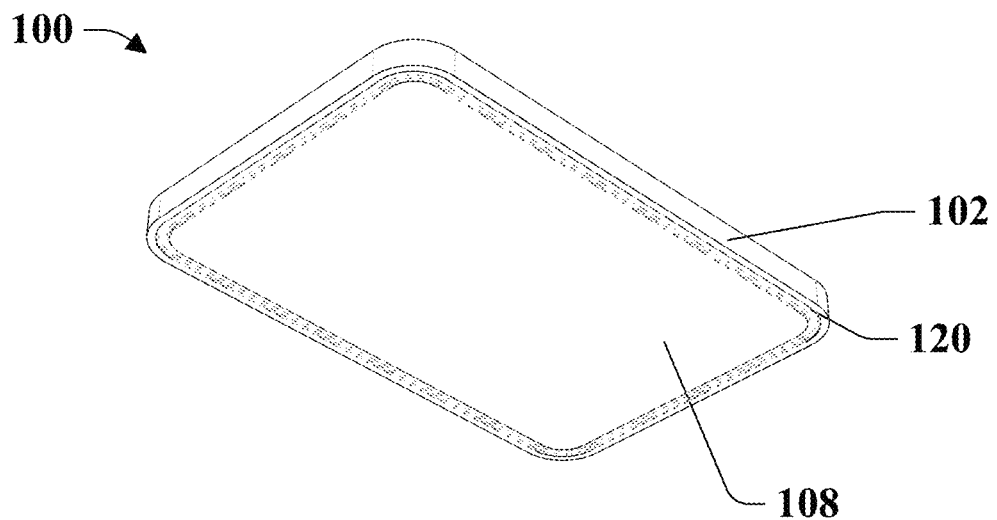
FIG. 4 is a bottom perspective view of an exemplary cutting board apparatus.
Figure 5:
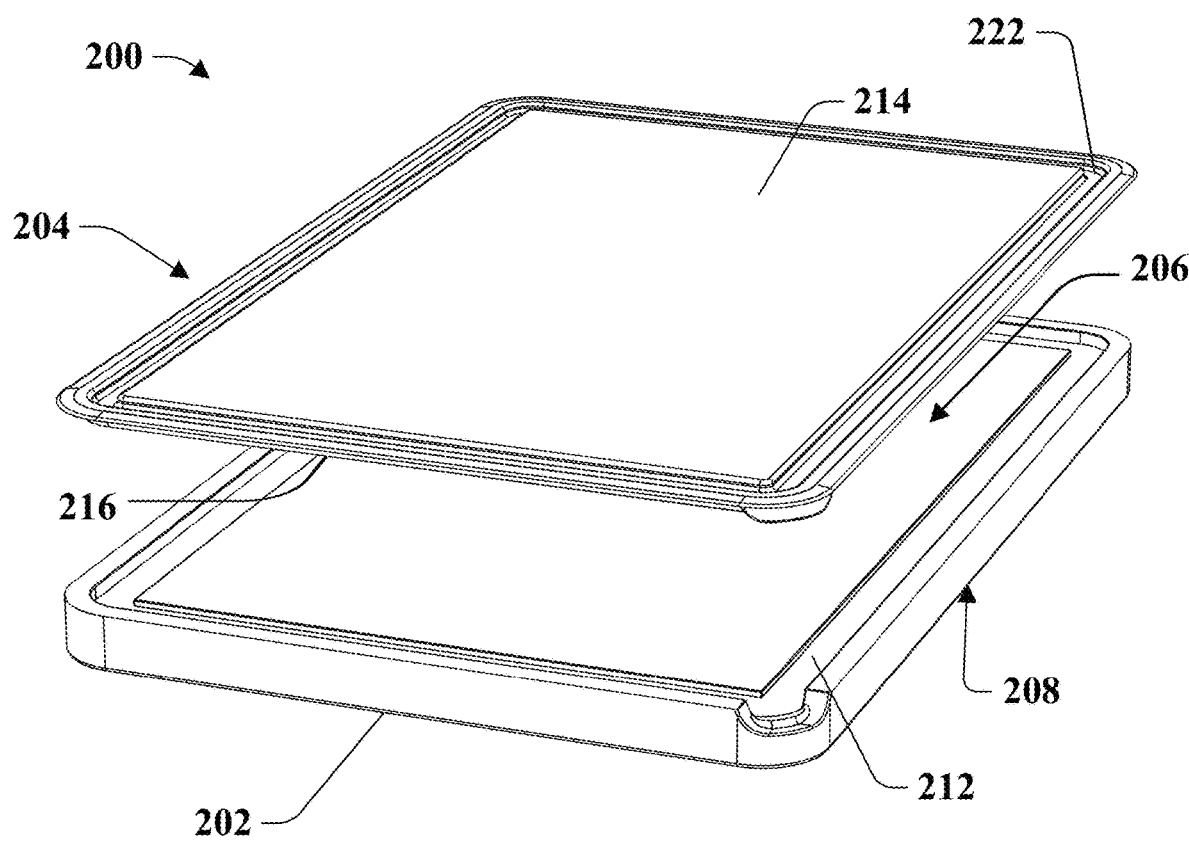
FIG. 5 is a perspective view of an exemplary cutting board apparatus.

FIGS. 3 and 4 depict the cutting board apparatus 100 in a nested configuration with the flexible cutting mat 104 nested with the first side 106 of the cutting board base 102. As shown in FIG. 4, the second side 108 of the cutting board base 102 can also be utilized as a cutting surface. The second side 108 of the cutting board base 102 can also include an opposing channel 120 that extends around at least a portion of the perimeter of the cutting board base 102. The opposing channel 120 can be configured to collect juices that run off of food or items that are being cut on the second side 108 of the cutting board base 102.

Turning now to FIGS. 5-8, an exemplary embodiment of the cutting board apparatus is shown at 200. The cutting board apparatus 200 is substantially the same as the above-referenced cutting board apparatus 100, and consequently the same reference numerals but indexed by 200 are used to denote structures corresponding to similar structures in the cutting board apparatus 200. In addition, the foregoing description of the cutting board apparatus 100 is equally applicable to the cutting board apparatus 200 except as noted below.

Cutting board apparatus 200 can include a cutting board base 202 and a flexible cutting mat 204. The cutting board base 202 can include a first side 206 and a second side 208 opposite the first side 206, either of which can be used as a cutting surface. The cutting board base 202 can include a first channel 212 on the first side 206 that extends around at least a portion of the perimeter of the cutting board base 202. The first channel 212 can be configured to collect any juices running off the first side 206 while in use as a cutting surface.

The flexible cutting mat 204 is substantially similar to the flexible cutting mat 104 described above. The flexible cutting mat 204 can include a cutting surface 214 and a gripping surface 216 opposite the cutting surface. However, the flexible cutting mat 204 can further include a second channel 222 configured to removably nest within the first channel 212.

The flexible cutting mat 204 with the second channel 222 and the flexible cutting mat 104 without a channel can both be formed from the same mold. A single mold having a form for a second channel 222 can be used to produce both mats. The mold can be used unaltered to produce the flexible cutting mat 204 so that the second channel 222 is included. However, the mold can be altered by inserting a frame insert to cover up the form for the second channel 222. The frame insert instead includes a form for the beveled edge 118 of the flexible cutting mat 104. By utilizing the frame insert in the mold, the resulting flexible cutting mat 104 is identical to the flexible cutting mat 204 except for the absence of the second channel 222 and the inclusion of the beveled edge 118.

Figure 6:
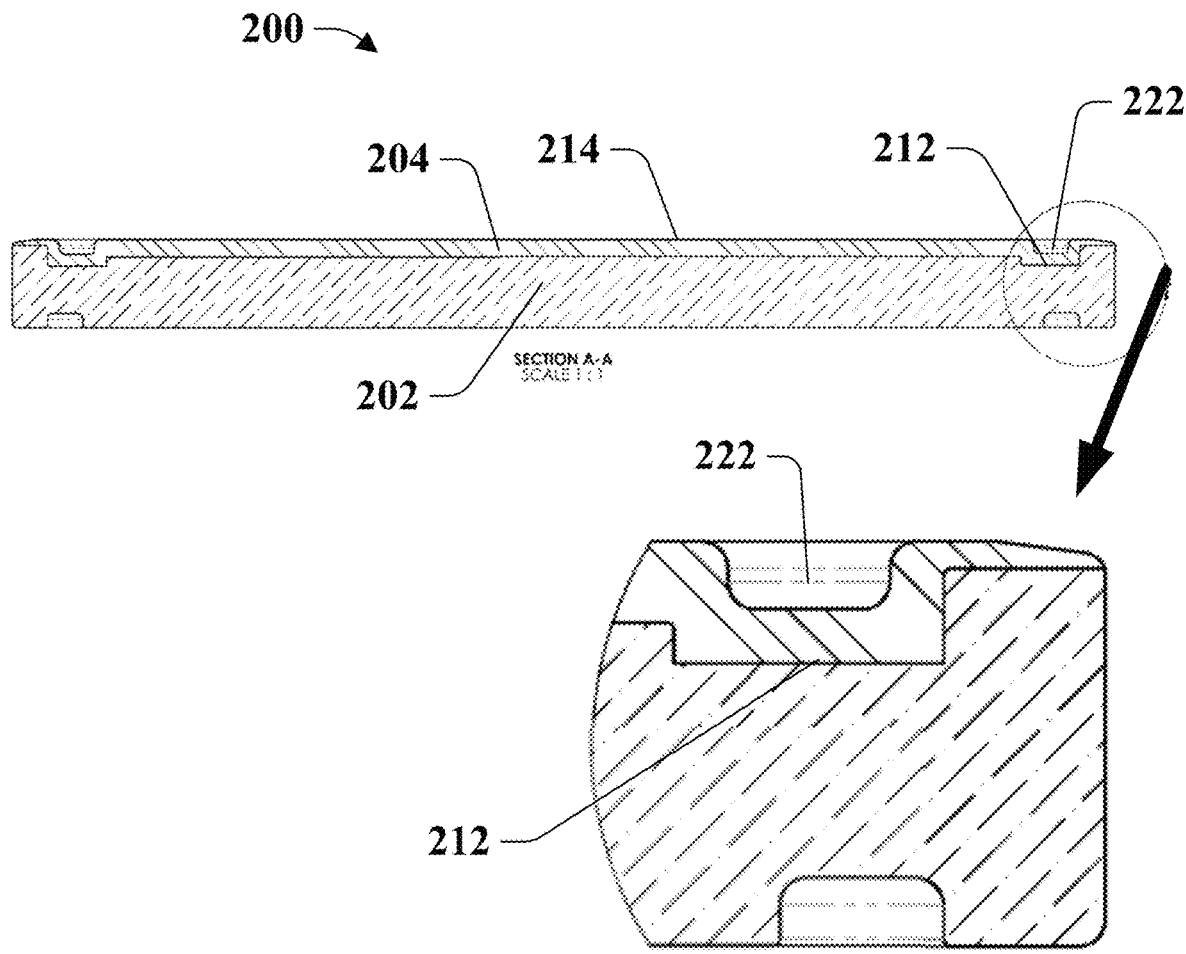
FIG. 6 is a cross-sectional view of an exemplary cutting board apparatus.

Turning now to FIG. 6, a cross-sectional view of the cutting board apparatus 200 is shown. FIG. 6 depicts the flexible cutting mat 204 in a nested configuration with the cutting board base 202 such that the flexible cutting mat 204 is removably nested with the first side 206 of the cutting board base 202 such that the second channel 222 of the flexible cutting mat 204 is removably nested with the first channel 212 of the cutting board base 202. In operation, a user can cut, for example, a fruit or a meat on the flexible cutting mat 204 while it is nested with the cutting board base 202. Any juices that run off from the food can run from the cutting surface 214 and into the second channel 222, where the juices can be collected for later disposal or removal. The second channel 222 can similarly collect juice runoff while the flexible cutting mat 204 is used independently from the cutting board base 202.

Figure 7:
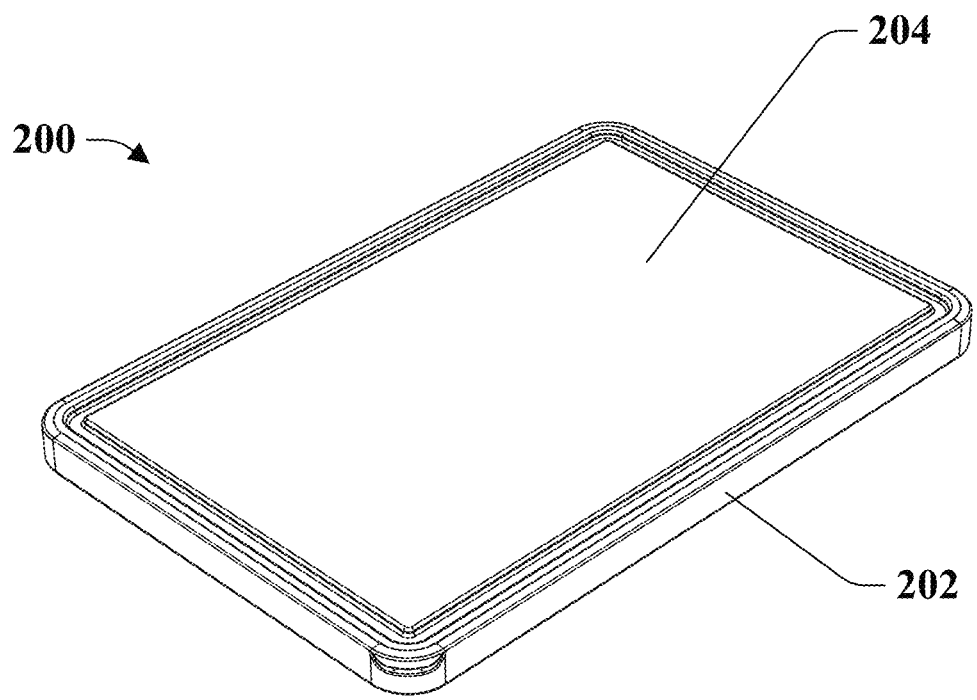
FIG. 7 is a perspective view of an exemplary cutting board apparatus in a nested configuration.
Figure 8:
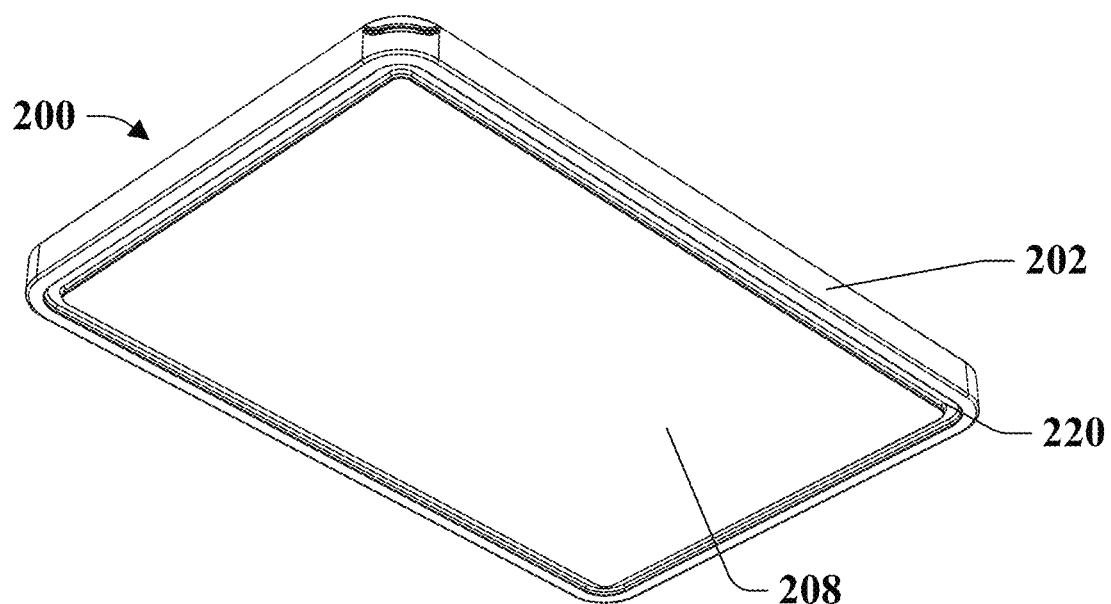
FIG. 8 is a bottom perspective view of an exemplary cutting board apparatus.

FIGS. 7 and 8 depict the cutting board apparatus 200 in a nested configuration with the flexible cutting mat 204 nested with the first side 206 of the cutting board base 202. As shown in FIG. 8, the second side 208 of the cutting board base 202 can also be utilized as a cutting surface. The second side 208 of the cutting board base 202 can also include an opposing channel 220 that extends around at least a portion of the perimeter of the cutting board base 202. The opposing channel 220 can be configured to collect juices that run off of food or items that are being cut on the second side 208 of the cutting board base 102.

Figure 9A:
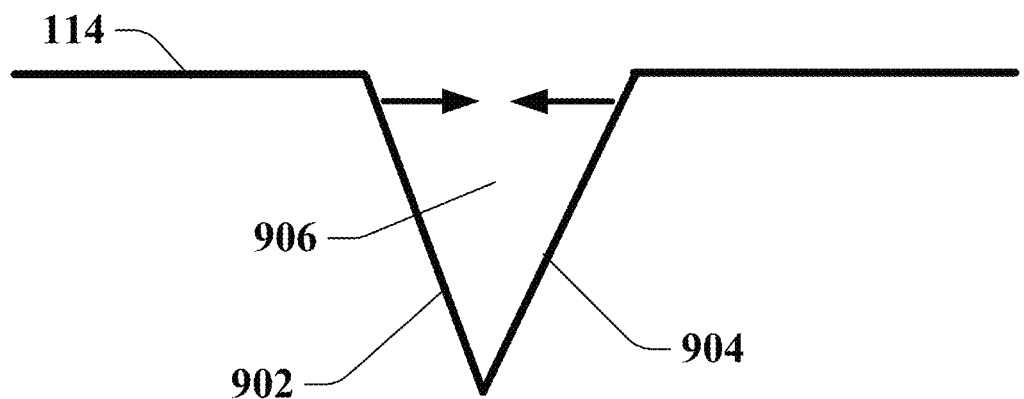
FIG. 9A is a cross-sectional schematic of an exemplary cutting surface.
Figure 9B:
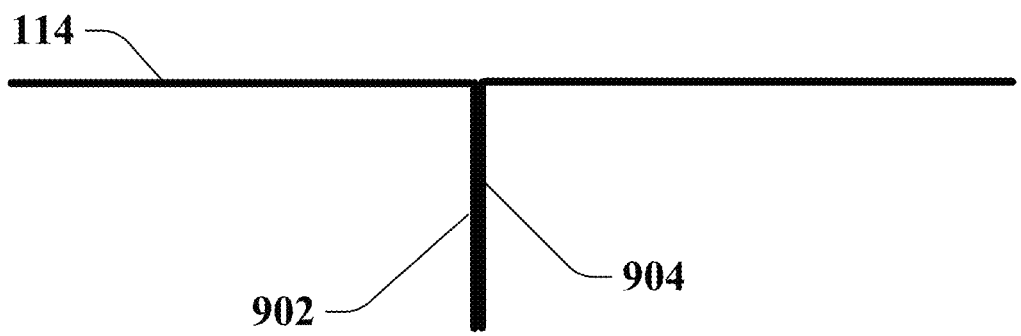
FIG. 9B is a cross-sectional schematic of an exemplary cutting surface.

Turning now to FIGS. 9A and 9B, the cutting surface 114 (or 214) can be a self-healing cutting surface such that the cutting surface 114 is configured to, upon receiving a cut from a cutting tool such as a knife, significantly close sides 902 and 904 of the cut back upon themselves to at least partially seal the cut. When a cutting tool such as a knife cuts into the cutting surface 114, a trough 906 is formed. The trough 906 includes a first side 902 and a second side 904 formed on either side of the blade of the cutting tool. If a trough 906 were to remain, the trough 906 could harbor micro-ban, bacteria, or food particles, creating an unsanitary condition for food preparation. However, the self-healing nature of the cutting surface 114 includes elastomeric sides 902 and 904 that close back towards each other to at least partially seal the trough 906 closed as depicted in FIG. 9B. The sealed trough 906 mitigates and reduces the aforementioned micro-ban, bacteria, or food particles from building up within the cutting surface 114. It should be further appreciated that the first side 902 and the second side 904 of the trough 906 created by the blade of the cutting tool grip the blade of the cutting tool to provide friction and a resulting braking force as described above. This braking force slows down the movement of a cutting tool and allows for a safer use by the user.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component that performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A cutting board apparatus comprising:
   a cutting board base formed from a rigid material, wherein the cutting board base includes a first side and a second side opposite the first side, and the cutting board base further comprises a first channel extending along at least a portion of a perimeter of the first side of the cutting board base; and
   a flexible cutting mat having a cutting surface and a gripping surface opposite the cutting surface, wherein the flexible cutting mat is configured to removably nest with the first side of the cutting board base, wherein the flexible cutting mat comprises a thermoplastic elastomeric material, wherein the flexible cutting mat is at least partially surrounded by the first channel when the flexible cutting mat removably nests on the first side of the cutting board base, and wherein the flexible cutting mat includes beveled edges that slope from the cutting surface of the flexible cutting mat towards the first channel while the flexible cutting mat is nested with the first side of the cutting board base.

2. The cutting board apparatus of claim 1, wherein the flexible cutting mat further comprises polypropylene in the range of 1% to 30% of the material makeup of the flexible cutting mat.

3. The cutting board apparatus of claim 1, wherein the flexible cutting mat further comprises polypropylene in the range of 1% to 10% of the material makeup of the flexible cutting mat.

4. The cutting board apparatus of claim 1, wherein the flexible cutting mat has a durometer in the range of 45 to 65.

5. The cutting board apparatus of claim 1, wherein the flexible cutting mat has a durometer in the range of 55 to 65.

6. The cutting board apparatus of claim 1, wherein the cutting surface of the flexible cutting mat is a self-healing surface configured to, upon receiving a cut, significantly close sides of the cut back upon themselves to at least partially seal the cut.

7. A cutting board apparatus comprising:
   a cutting board base formed from a rigid material, wherein the cutting board base includes a first side and a second side opposite the first side and comprises a first channel extending along at least a portion of a perimeter of the first side of the cutting board base; and
   a flexible cutting mat having a cutting surface and a gripping surface opposite the cutting surface, wherein the flexible cutting mat is configured to removably nest with the first side of the cutting board base, and wherein the flexible cutting mat comprises a thermoplastic elastomeric material; and
   wherein the flexible cutting mat further comprises a second channel extending along at least a portion of a perimeter of the cutting surface of the flexible cutting mat, wherein the second channel is configured to removably nest within the first channel while the flexible cutting mat is nested with the first side of the cutting board base.

8. The cutting board apparatus of claim 7, wherein the cutting board base comprises an opposing channel extending along at least a portion of a perimeter of the second side of the cutting board base.

9. A flexible cutting mat comprising:
   a cutting surface that is a self-healing surface configured to, upon receiving a cut, significantly close sides of the cut back upon themselves to at least partially seal the cut; and
   a gripping surface opposite the cutting surface,
   wherein the flexible cutting mat comprises a thermoplastic elastomeric material and polypropylene in the range of 1% to 30% of the material makeup of the flexible cutting mat;
   wherein the flexible cutting mat further comprises a first channel extending along at least a portion of a perimeter of the cutting surface of the flexible cutting mat, and
   wherein the first channel is configured to removably nest within a second channel extending along at least a portion of a perimeter of a first side a cutting board base while the flexible cutting mat is nested with the first side of the cutting board base.

10. The flexible cutting mat of claim 9, wherein the polypropylene is included in the range of 1% to 10% of the material makeup of the flexible cutting mat.

11. The flexible cutting mat of claim 9, further comprising a channel extending along at least a portion of a perimeter of the cutting surface of the flexible cutting mat.

12. The flexible cutting mat of claim 9, wherein the flexible cutting mat has a durometer in the range of 45 to 65.

13. The flexible cutting mat of claim 9, wherein the flexible cutting mat has a durometer in the range of 55 to 65.

* * * * *